UNITED STATES PATENT OFFICE.

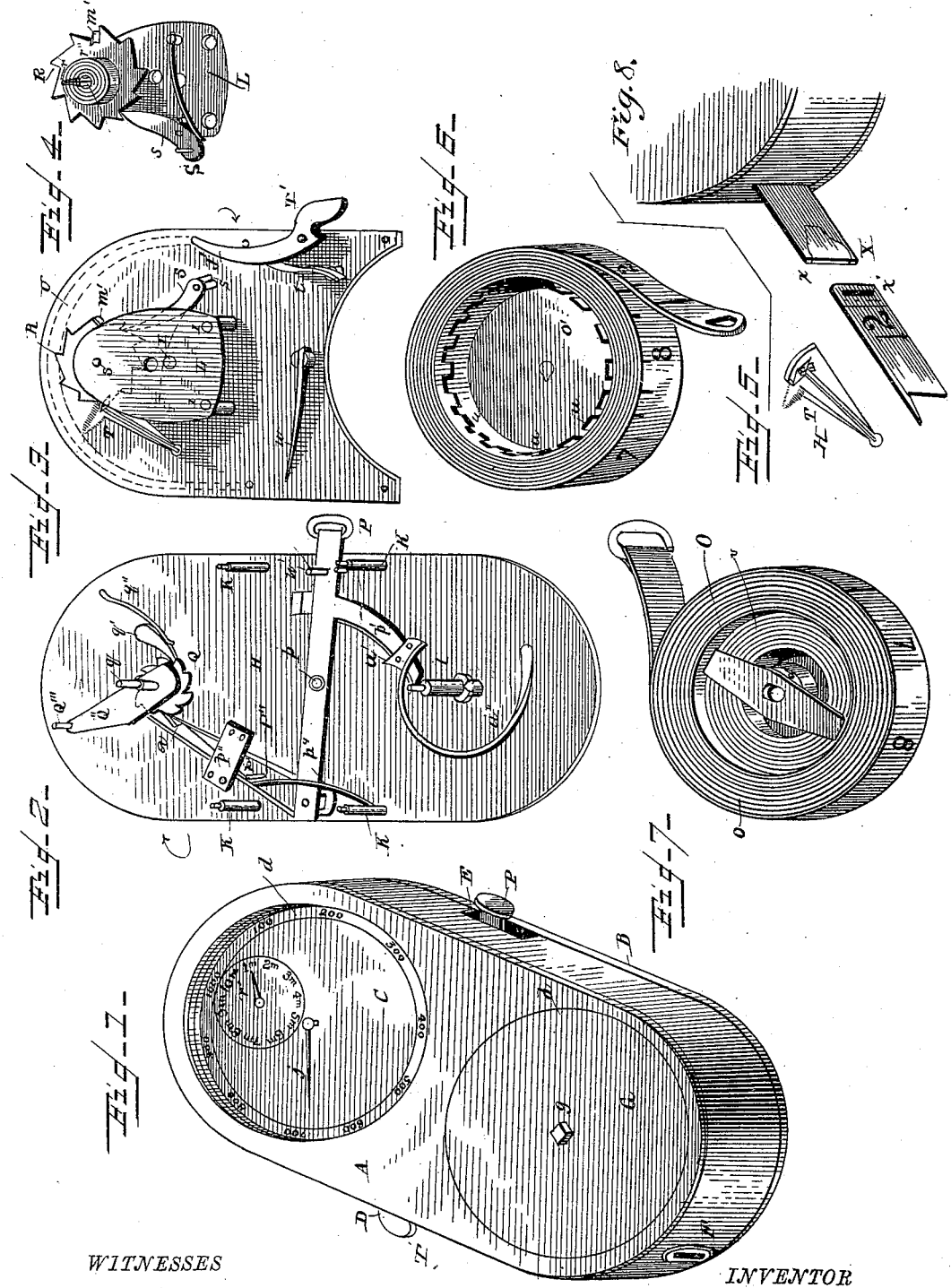

WILLIAM B. HUNT, OF DUBUQUE, IOWA.

REGISTERING TAPE-MEASURE.

SPECIFICATION forming part of Letters Patent No. 355,320, dated January 4, 1887.

Application filed June 10, 1886. Serial No. 204,817. (No model.)

*To all whom it may concern:*

Be it known that I, WILLIAM B. HUNT, of Dubuque, in the county of Dubuque and State of Iowa, have invented certain new and useful Improvements in Self-Registering Tape-Measures; and I do hereby declare the following to be a full, clear, and exact description of the invention, such as will enable others skilled in the art to which it pertains to make and use the same.

My invention relates to self-registering tape-measures designed especially for lumbermen's use.

The object of the invention is to facilitate the measuring of large quantities of lumber by the use of a short tape-line in connection with automatic registering devices.

The invention consists, primarily, in combining, with a suitable casing, a tape-line and retracting-spring therefor, and mechanism for registering the measurement automatically as the tape-line is retracted.

The invention further consists in various combinations of devices, hereinafter fully described, whereby a short tape-line may be used to measure a given number of feet and then retracted to register the measurement, the registering devices being arranged to register in different units of measurement—as, for instance, hundreds of feet and thousands of feet.

In the accompanying drawings, Figure 1 is a view in perspective of my device complete. Fig. 2 is a plan view of the main or base plate of the device with its appliances. Fig. 3 is a reverse plan view of the upper plate of the apparatus with its operating parts. Figs. 4 and 5 are detail views. Figs. 6 and 7 illustrate, respectively, bottom and top views of the cylinder which receives the tape-line and its spring; and Fig. 8 represents an improved means for attaching the inner end of the tape-line.

B represents a box or casing, preferably of oblong or oval form, and provided with a cover, A. The box and cover are each slotted at the sides, to form openings D, E, and F, and the cover is also formed with two circular openings, d and d'.

H represents the base-plate of the device, formed to fit within and rest upon the bottom of the box.

I represents a post rising from the plate H, to project centrally through the opening d of the cover. A cylinder, O, is arranged about the post, and within said cylinder a spring, v, is coiled around the post, one end of the spring being secured to the cylinder, while the opposite end is attached to the post. To the outer side of the cylinder is secured one end of the tape-line o, which is adapted to be wound around the cylinder, as shown. The cylinder O is divided by a horizontal partition, o', upon which the spring v rests, and below said partition the rim or flange of the cylinder is formed with a series of slots, u, to receive a dog, u', which is forced to place in the slots of the cylinder by a spring, u''.

P represents a lever fulcrumed upon a pivot, p, at about the center of the plate H. This lever is provided with a downwardly-projecting arm, P', adapted to contact, when desired, with a stop on the under side of the dog u', to release the cylinder O. The arm P' is held out of contact with the dog by a spring, w, which is secured to the upper plate of the device and bears against a stop-pin, w', on the lever P.

The plate H is slotted to receive the arm P', said arm being bent slightly to move within said slot.

The lever P extends across the plate H, and to its inner end is pivoted an arm, P'', arranged within an inclined slot of the plate, and guided by cross-straps $p''$ $p''$. A pin, p', projects from the arm P'', and against this pin bears a spring, $p^4$, secured to any convenient part of the plate. The free end of the arm P'' is formed with a head, a, adapted to engage with a ratchet-wheel, Q, which is rigidly mounted on a shaft, q, having bearing at its lower end in an opening on the base-plate H, and passing through an opening in the supplemental plate L and the upper plate, J, and the dial C, and carrying at its upper end a pointer, j. A dog, q', is secured upon the plate H, adjacent to the wheel Q, and operates with a spring, q''.

Q'' represents an arm secured rigidly upon the shaft q, to turn therewith, and provided with a pin, Q''', to engage a ratchet-wheel, as will be described.

The wheel Q and its attachments, with the dial C, constitute a register, which I will term the "primary" register, to distinguish it from another register to be described.

The upper plate, J, is secured upon the base-plate H, upon posts k, which are shouldered and extend through openings in the plate J, where they are secured by pins or other means. To the under side of the plate J is secured a supplemental plate, L, by means of depending studs and screws l, as seen in Fig. 3. Between the plates J and L a ratchet-wheel, R, is arranged upon a shaft, r, whose upper end receives a pointer, r'. Between the plate J and wheel R a spring, r'', is wound around the shaft r, one end being secured to the shaft, while the other end is secured to the wheel. A spring-dog, S, contacts with the notches of the wheel R, to prevent accidental backward movement of the wheel. A lug, m', projects upwardly from the upper face of the wheel R, and said lug is adapted to strike a corresponding lug projecting from the head of a spring-stop, T, secured at one end within a triangular slot in the plate J. By the mechanism thus described the ratchet-wheel R is prevented from making more than one revolution, and when the spring-dog S is released from engagement with the wheel R the spring r'' cannot reverse the wheel more than one revolution, as the lug m' engages the spring-stop T on the other side.

J' represents a lever pivoted to one side of the plate J, and provided with a spring, t. This lever is adapted, when forced inwardly, to strike a pin, s, projecting from the dog S, to release the latter from engagement with the wheel R. The outer end, T', of the lever J' projects through the opening D of the casing, while the lever P projects through the opening E of the casing.

The upper side of the plate J is provided with a curved rest, U, (seen in dotted lines, Fig. 3,) to support the dial-face, and a glass cover or crystal, which latter is held in place by the projecting edges around the opening in the cover A.

A disk, G, having a central opening to receive the upper end of the post I, holds the cylinder O in position, the disk being held by a nut, g, upon the post.

The operation of the device thus constructed is as follows: The tape-line may be of short length, say, ten feet, and is drawn out its length, and the lumber is measured with the line until one hundred feet have been measured. Then the lever P is pressed inwardly, thus releasing the dog u' from the cylinder and retracting the tape-line, and also through the arm P'' moving the wheel Q one notch. The pointer j will thus be moved one point to register 100. The outer circle of figures on the dial represent hundreds, which are registered by the primary register. The tape-line is then drawn out again and the operation is repeated until the point j reaches the thousand-mark on the dial, at which time the arm Q', secured to the wheel Q, will have reached a point where its pin Q'' will strike on one of the teeth of the ratchet-wheel R, thus turning the latter, and also moving the pointer r' one point upon the dial, the small circle of figures marked 1 m, 2 m, &c., representing thousands. The operation as thus described may be continued without interruption until the dial-pointer r registers 10 m, (which is the limit of device here shown,) at which time the lug m' of the wheel R will strike the lug on the spring-stop T and arrest the movement of the wheel. The lever T' is then operated to disengage the dog S from the wheel, which permits the retraction of the wheel R, and resets the device for a measurement of ten thousand feet. It will thus be seen that the registering of the primary register is simultaneous with the retraction of the tape-line cylinder.

It is obvious that I do not confine myself to the exact construction of the device represented in the drawings, inasmuch as the limit of registration might be changed to any other figure than 10,000 by slightly modifying the construction, and other alterations might be resorted to without departing from my invention.

X represents a short metallic strip secured at one end to the cylinder O, and bent at its opposite end to form a hook, x, to receive the loop x'. This means of securing the line obviates the necessity of opening the casing when it is desired to renew the tape-line.

Having fully described my invention, what I claim as new, and desire to secure by Letters Patent, is—

1. The combination, with a box or casing of a tape-line arranged upon a revolving cylinder and provided with a retracting-spring, of a lever having an arm for operating the retracting-spring of the tape-line and another arm for operating the registering mechanism, substantially as described.

2. The combination, with the box or casing and with the tape-line cylinder and its attachments, of the lever for operating the tape-line retracting-spring and the registering mechanism which registers at a given unit of measurement, and an arm or lever secured to said registering mechanism and provided with a pin to set in motion a second register which registers at a higher unit of measurement than the first-named registering device, substantially as described.

3. In a self-registering tape-measure, the combination, with a cylinder which receives the tape-line and its coil-spring, and which is formed with a notched flange or rim, of a spring-dog to enter the notches of said rim and a lever provided with an arm to force said dog out of engagement with the rim, said lever pivoted to the base-plate and provided with a stop-pin, which, in connection with a spring on the upper plate, returns the lever to its primary position after being used to operate the said dog, substantially as described.

4. In a self-registering tape-measure, the combination, with the tape-cylinder and its retracting means and the operating-lever, of a spring-arm secured to the inner end of said lever and adapted at each inward movement of the lever to rotate the notched wheel of the primary register one notch, substantially as described.

5. The combination, with the main or base plate of the cylinder with its attachments, a lever for controlling the retraction of the tape-line, an arm secured to said lever for revolving the ratchet-wheel of the primary register, a top plate and the secondary registering devices secured thereto, and a lever-arm secured to the primary register to move the ratchet-wheel of the secondary register, substantially as described.

6. The combination, with the base-plate, the primary register, and the operating mechanism arranged upon said base-plate, of an upper plate having the secondary register-wheel R secured thereto and formed with a slot, within which is arranged a spring-stop provided with a lug which contacts with a lug on the register-wheel R, to arrest the revolution of said wheel, substantially as described.

7. The combination, with the upper plate, the supplemental plate, and the secondary register-wheel and its spring-stop, of a spring-dog pivoted to the supplemental plate and extended beyond its pivotal point to form an extension, said extension being provided with a pin which forms a point of contact for a lever for disengaging said dog from the ratchet-wheel of the register, substantially as described.

8. The combination, with the upper plate, of a ratchet-wheel mounted upon the post of the secondary register and provided with a retracting-spring and a depending stop or lug, and a spring-arm secured at one end in a triangular slot in the upper plate, and provided with a stop to engage the lug of the wheel when the secondary pointer registers 10 $m$, a spring-dog pivoted to the supplemental plate and provided with an extension for preventing accidental backward movement of said wheel, and a lever for retracting said dog to permit the ratchet-wheel to regain its primary position, substantialy as described.

9. The combination, with a box or casing formed with openings, substantially as described, of a base-plate and an upper plate seured together to support the mechanism and formed with bearings for the posts of the registers, a cylinder and its tape-line and coil-spring, a lever, P, having an arm to control said cylinder, a primary register consisting of a ratchet-wheel, post and pointer, and a spring-dog, an arm secured to the lever P, for moving said ratchet-wheel, a dial-face, and a secondary register consisting of a ratchet-wheel, post, spring-dog, pointer, and dial-face, and mechanism, substantially as described, for moving the wheel of the secondary register one notch at each complete revolution of the wheel of the primary register, substantially as described.

In testimony whereof I have signed this specification in the presence of two subscribing witnesses.

WILLIAM B. HUNT.

Witnesses:
FRANK H. WEIHE,
ALEXANDER SIMPLOT.